United States Patent [19]

Dybro et al.

[11] Patent Number: 5,671,894
[45] Date of Patent: Sep. 30, 1997

[54] RETRACTOR WITH LOAD LIMITING SPOOL WITH DECOUPLED PRETENSIONER

[75] Inventors: Niels Dybro, Utica; Harold John Miller, III, Troy, both of Mich.

[73] Assignee: AlliedSignal Inc., Morristown, N.J.

[21] Appl. No.: 514,074

[22] Filed: Aug. 11, 1995

[51] Int. Cl.⁶ .......................... B60R 22/28; B60R 22/46
[52] U.S. Cl. ........................... 242/374; 242/379.1
[58] Field of Search ................. 242/374, 379.1; 280/805, 806; 297/470, 471, 472, 476, 477, 478

[56] References Cited

U.S. PATENT DOCUMENTS

| | | | |
|---|---|---|---|
| 3,942,819 | 3/1976 | Schwanz et al. | |
| 3,952,967 | 4/1976 | Barile et al. | 242/379.1 |
| 5,489,072 | 2/1996 | Gordon et al. | 242/374 |
| 5,511,739 | 4/1996 | Dybro et al. | |
| 5,522,564 | 6/1996 | Schmidt et al. | 242/374 |

FOREIGN PATENT DOCUMENTS

| | | |
|---|---|---|
| 0 709 266 | 5/1996 | European Pat. Off. |
| 2 242 998 | 4/1975 | France. |
| 2 303 570 | 10/1976 | France. |
| 2 235 017 | 1/1974 | Germany. |

*Primary Examiner*—John M. Jillions
*Attorney, Agent, or Firm*—Markell Seitzman

[57] ABSTRACT

A safety system comprising: energy absorbing seat belt retractor (20) and a pretensioner for initiating rewinding a retractor spool (24) and the seat belt (31) subsequent to an accident; the retractor (20) includes bushings for rotationally mounting the spool (24) so that it rotates relative to a frame (22) and an energy absorbing device (70, 90, 100, 102) for permitting the controlled rotation of the spool and the controlled protraction of the belt as the belt is loaded by an occupant, such controlled protraction of the belt being independent of the amount that the spool was caused to rewind in response to the operation of the pretensioner.

19 Claims, 3 Drawing Sheets

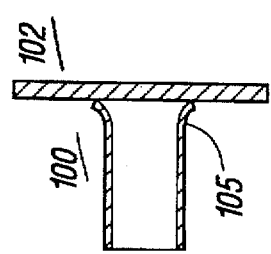
FIG. - 6
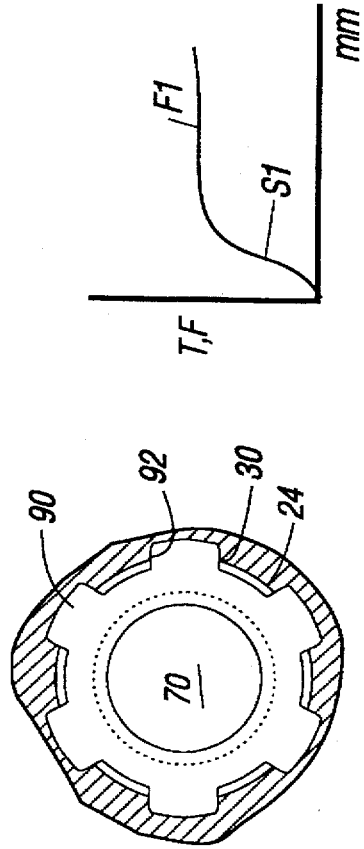
FIG. - 5
FIG. - 7
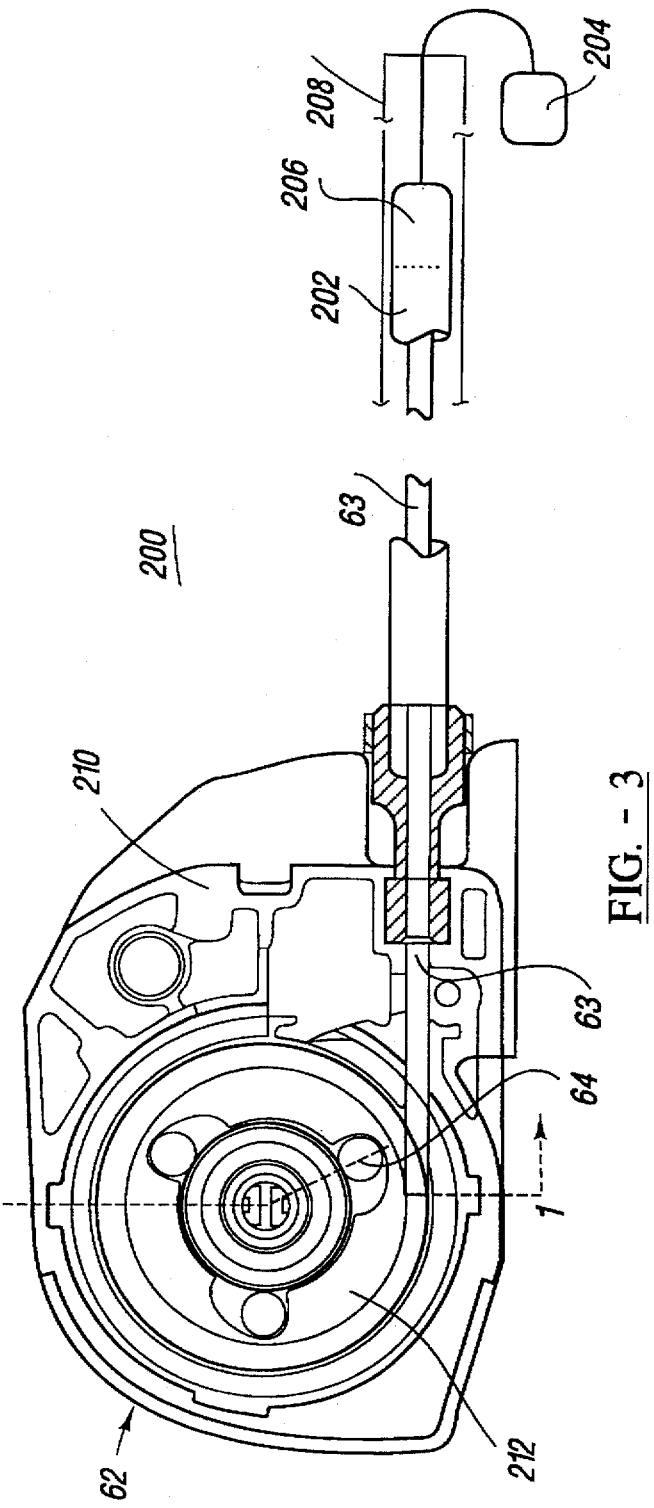
FIG. - 3

RETRACTOR WITH LOAD LIMITING SPOOL WITH DECOUPLED PRETENSIONER

BACKGROUND AND SUMMARY OF THE INVENTION

The present invention generally relates to seat belt retractors that are useable with pretensioners or belt-tightening mechanisms and retractors that also include means for limiting the loads imparted to the seat belt by generating a determinable level restraining force on the spool and belt to thereby control the forward motion of the occupant during an accident.

Retractors that operate in conjunction with pretensioners or belt tighteners, as they are also called are currently used in industry. A typical pretensioner for a seat belt retractor comprises a movable piston joined to a clutch via a cable. Clutch jaws or rollers are moved into engagement with a part of the retractor spool or shaft to reverse rotate the spool as the cable is pulled outwardly. The operation of this combination of components is generally known and need not be described in any detail. Some seat belt retractors also incorporate an energy absorbing mechanism the purpose of which is to generate a reaction force or torque which opposes and controls or limits the loads on the seat belt as the belt is loaded by the occupant during an accident. This controlled reaction force limits the occupant's forward motion during an accident and in so doing limits the head injury criteria (HIC) and chest loads or acceleration. FIG. 1 shows a seat belt retractor that incorporates both of the above features, that is, a pretensioner A and a load limiter B comprising a movable nut C having a set of hardened balls D that deform a portion of a spool E as the nut and balls move. The incorporation of a pretensioner with a retractor having a load limiting function can reduce the effectiveness of the load limiter. This limitation arises from the following: at the inception of an accident the pretensioner in cooperation with a clutch reverse winds the retractor spool to eliminate slack in the lap and/or shoulder belt. Subsequently, the load limiting device permits the spool to rotate in an opposite, belt unwinding direction permitting the controlled protraction of the seat belt. If the pretensioner remains coupled to the spool, by for example the continued engagement of the clutch rollers or jaws, then the amount of permitted protraction under control of the load limiter is limited by the pretensioner stroke, i.e., to the amount of webbing rewound during operation of the pretensioner. The present invention eliminates this limitation. The above limitation arises principally because the pretensioner, via an axle part F, directly drives the spool E.

It is an object of the present invention to provide a seat belt retractor that incorporates a load limiting function and a pretensioner function and one in which the operation of the pretensioner does not limit the functionality of the load limiter.

The present invention defines a retractor/pretensioner combination in which the amount of webbing that is permitted to be protracted under control of the load limiter is independent of pretensioner stroke. An advantage of the present invention is that the operation of the load limiting device is limited only by its design parameters and characteristics and not the characteristics of the pretensioner.

BRIEF DESCRIPTION OF THE DRAWINGS

In the drawings:

FIG. 3 is a right hand side view of FIG. 2.

FIG. 4 is a partial cross-sectional view through section lines 4—4 of FIG. 2.

FIG. 5 is a graph showing a constant reaction force profile.

FIG. 6 shows a bushing having a flanged end.

FIG. 7 shows another graph of reaction force.

DETAILED DESCRIPTION OF THE DRAWINGS

Figure 2:
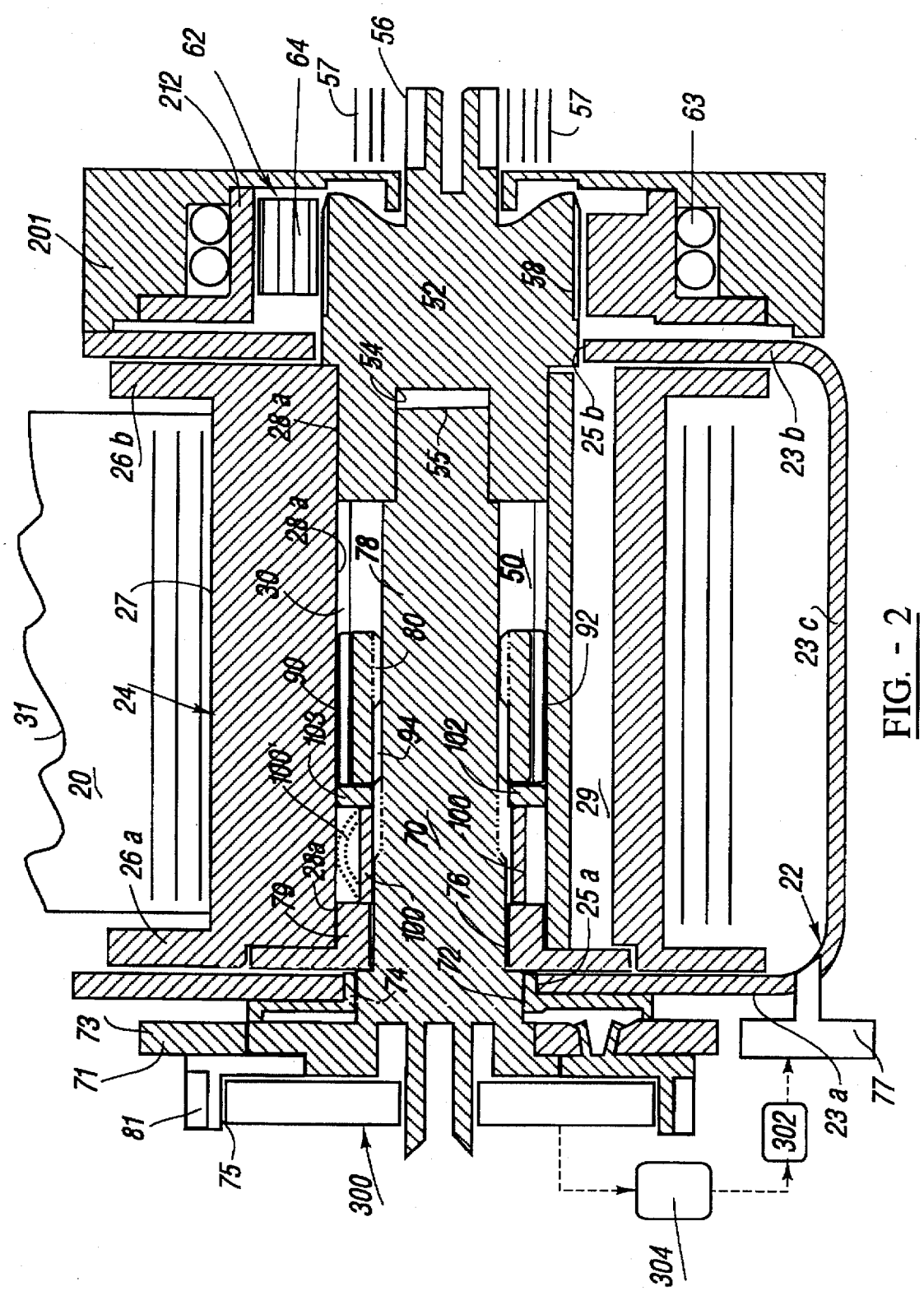
FIG. 2 illustrates a cross sectional view illustrating the major components of the present invention.

Reference is made to FIG. 2 which illustrates a retractor 20 having a U-shaped frame 22 adapted to be connected to a part of a vehicle body or to a part of an occupant seat. The frame includes frame sides 23a,b having respective openings 25a and 25b and a rear or connecting part 23c. The central openings may be of different diameter as shown or the same which will depend upon how the spool is supported on the frame sides. The retractor additionally includes a spool or reel 24 rotatably mounted to the frame 22. The spool includes two (2) flanges 26a and 26b, a center part 27 about which seat belt webbing 31 is wound and a center bore 28 which includes a plurality of axially directed splines, slots or keys ways 30. The center part 27 includes a slot 29 which provides a means for inserting one end of the seat belt 31 into the spool in a known manner.

Partially situated within the bore 28, is an axle assembly 50 which includes a first member 52 inserted in bore end 28a, and a second member 70 at bore end 28b. The first member 52 includes a walled portion 53 received in bore end 28a and provides a bushing surface to rotatably support the spool. The first member 52 also includes a hexagonal bore 54 to provide a driving, rotational engagement with a complementary shaped end 55 of the second member 70 of the axle assembly. The first member 52 includes a forked end 56 that forms a spring arbor and is adapted to receive a rewind spring 57, of known construction to retract the extended seat belt. The clutch 62 shown in greater detail in FIG. 3 is a part of a pyrotechnic pretensioner 200 (or belt tightener) mechanism which includes a quantity of pyrotechnic material 202. Upon receipt of an electric control signal generated by an electric control module 204 the material generates products of combustion which drive a piston 206 down a tube 208 to pull a wire cable 63 causing clutch shoes or rollers 64 to move inwardly engaging and forcibly rewinding member 52. As discussed below this action reduces unneeded slack in the belt 31 (or belt system consisting of a torso and/or lap belt) connected to the retractor 20. The pretensioner 200 additionally includes a housing 210 and a carrier member 212 which holds and guides the rollers 64. The specific construction of the pretensioner is not important to the present invention. As can be seen from FIG. 2 the carrier member 212 of the clutch 62 supports the first member 52 of the axle assembly 50 and provides a bearing surface upon which an intermediate portion 58 of the axle assembly 50 rotates prior to activation of the pretensioner 200. From the above it can be appreciated that the pretensioner 200 is not directly coupled to the retractor spool 24 but drives the first member 52 which is itself rotationally decoupled from the spool 24.

The second member 70 includes a first part 72 that is supported relative to the frame 22 by a bearing 74. The second member 70 additionally includes a second part 76 fitted against an annular member 79 which serves as a mechanical stop. The member 79 is received within a groove of the spool and also provides a bearing surface about which the spool rotates. The second member 70 includes a narrow portion 78 that extends further into the center of the bore 28. This narrow portion 78 includes a plurality of threads 80 and terminates in the hexagonally shaped end 55 which is driven by the first member 52. A carrier member such as a threaded nut 90 interposes the narrow member 78 and the spool 24. As can also be seen from FIG. 2 the inside surface of the nut includes threads 94 which matingly engage threads 80 of the narrow portion 78. This nut, on its outer surface, includes a plurality of splines 92 which permit the nut to move axially along the cooperating splines 30 of the spool 24 as it rotates on the threads 80. As can be appreciated the threads can be on the spool and the splines on the narrow portion 78. The second member 70 also includes a lock wheel 71 that a may be integrally formed or separate having lock teeth 73 thereon engaged by a locking pawl 77 rotatably mounted to the frame 22 in a known manner. Situated between the nut 90 and the stop member 79 is a deformable, energy absorbing bushing 100 and a thrust washer 102. There is a clearance fit between the washer 102 and the spool bore 28 and a slidable engagement with the outer diameter of the second member 70. The purpose of the thrust washer is to eliminate any torsional loading between the nut and the bushing 100 and permit the nut to be free to rotate relative to the washer 102. The primary reason for eliminating or at least minimizing the torsional loading between the nut and the washer 102 is to better control the mode of deformation of the crushable member or bushing 100. The torsional loading can be effectively eliminated by providing a slick, low friction interface at or a coating to the end face 91 or the entire surface of the nut 90. Such interface or coating might include coating the nut with a fluorocarbon material or chrome plating the nut. Another low friction interface might be achieved by a nitride coating on the nut or fabricating the nut using an oil impregnated, sintered metal.

In addition, experience has shown that the surface condition of the washer 102 can affect the mode of deformation of the bushing 100 and thereby the reaction torque (or force) generated by the retractor 20. Testing has shown that if this surface is ground smooth the reaction force generated, at the interface of the washer and the bushing, tends to cause the end 105 of the bushing to flare outwardly as shown is FIG. 6. With the end of the bushing flared outwardly it has been found that the reaction force generated on the seat belt by the retractor is not limited as in FIG. 4 but tends to increase (see FIG. 7) with further compression of the bushing 100. If the surface 103 is rough, the bushing buckles and assumes a preferred barrel-like shape permitting achievement of the above mentioned limited reaction force characteristic. In tests of the present invention a roll formed bushing has been used or one that was lightly sand blasted. A surface roughness of greater than 32 microns should provide the proper amount of roughness to insure the desired bushing deformation characteristic. To enhance the attainment of this barrel-like shape during the compression of the bushing it may be desirable to use a bushing that is initially barrel shaped, that is, its diameter is larger near its middle than at its ends. One such barrel-like bushing is shown in phantom line 100'. The bushing 100' can be a pre-form shaped by hydro-form or roll forming processes.

The retractor additionally includes a web sensor 300 and a vehicle sensor 302. Member 70, that is the lock wheel 71, is locked in response to information derived from the vehicle sensor and a web sensor. These sensors respectively sense excessive vehicle deceleration and an excessive rate increase of seat belt protraction from the retractor 20. One such vehicle sensor 302 and web sensor 300 are diagrammatically shown in FIG. 2. In reality the web sensor may be nestled within a lock cup 304 which is received adjacent a ratchet wheel 75. The vehicle sensor is carried by the lock cup and includes a sensor pawl that engages ratchet teeth 81. Movement of the lock cup moves the lock pawl 77 into engagement with the lock teeth 73. European Patent Document EP 0 228 729A1 is illustrative of a retractor having a web sensor, vehicle sensor, lock cup to move the lock pawl 77 into engagement with the a lock wheel. This document is incorporated herein by reference.

During an accident the lock wheel is stopped by the action of the various sensors and the pretensioner 200 is activated to reverse wind the spool. More specifically the first member 52 is reverse wound under control of the pretensioner 200 and clutch 62. The rotation of the first member 52 is transferred to the second member 70 through the interface of the of the bore 52 and end 55. The rotation of the second member 70 is transferred to the spool 24 through the threaded and splined interconnection of the second member/ nut/spool. Thereafter the spool 24 is reverse wound to eliminate slack in the seat belt (shoulder and/or lap belt). As can be appreciated, with the pawl 77 engaging the teeth 73 of the lock wheel 71 the second member 70 cannot rotate in a belt unwinding direction. Subsequently, the occupant will tend to move forward as the accident progresses and load the seat belt 31. The occupant's motion (position and acceleration) are then controlled by the reaction force generated within the retractor. The occupant's load on the shoulder belt is partially transmitted via the remaining seat belt webbing wound about the center part 27 of the spool 24 creating a torque tending to rotate the spool, in a belt unwinding direction. As previously mentioned the spool rotates about the bearing surfaces provided by the first member 52 and the member 79. The tendency of the spool to rotate is curtailed by the reaction forces generated at the interfaces between the nut 90 and the spool 24, the nut and the second member and the lock wheel 71 and the lock pawl 77. The loads (or torques) imparted to the spool are transmitted directly to the threads 80 of the now locked second member 70 which tends to cause the nut 90 to try to rotate to the left about the threads 80 as viewed in FIG. 2 and simultaneously slide along the splines 30. This motion is initially halted by the bushing 100 which is loaded between the stop member 79 and washer 102. At some level of belt force the torsional forces developed at the thread 80/94 interface will be sufficient to cause the bushing 100 to begin to deform. Once this force level is reached the nut 90 will continue to rotate and slide along compressing or deforming the bushing. As can be appreciated as the spool rotates, seat belt webbing is permitted to protract in response to the pulling force exerted by the occupant on the seat belt. The pulling force is limited principally by the reaction force capability of the shaft assembly 50, that is, the compression characteristics of the bushing 100. In this manner the HIC and chest loading of the occupant is limited. As can be seen from the above and in the preferred embodiment of the invention, control of the occupant's motion is obtained by generating a substantially constant reaction force against the belt. This constant reaction force permits the occupant to be subjected to a controlled, generally constant acceleration. A non-constant reaction force such as that generated in FIG. 7 can be generated by permitting the end of the bushing to flare outwardly.

Reference is briefly made to FIG. 4. As mentioned above, rotation of the spool 24 causes the nut 90 to advance against the ring or bushing 100. As the bushing 100 is compressed (see S1 of FIGS. 5 and 7) the reactive force is defined generally by the yield strength of the bushing. During this phase of operation the bushing is in an elastic mode of deformation. Further rotation of the spool and movement of the nut compresses the bushing to its yield strength limit (into a plastic region of deformation) and generates through the nut the reaction force or torque on the spool which in turn generates a constant reaction force F1 (see FIG. 5) on the belt. The dimensions of the outer bore 28 and the length and material of the bushing 100 are chosen to achieve a generally constant reaction force during the primary accident which is approximately in the range of 400–2000 lbs. (1780–8900 Newtons) while permitting webbing to protract. As an example it has been found that during a typical accident the occupant might cause the amount of about 20 cm (8 inches) of webbing to be protracted from the retractor. This amount of protraction can be directly equated to deformation of the bushing. As such, the bushing length and the thread pitch of threads 80 and 94 can be chosen to permit the nut 90 to be able to move the anticipated distance to the left. Depending upon the crash characteristics the desired reactive load generated in the retractor can be in the range of 400 lbs. to 2000 lbs. (1780–8900 Newtons). Typically this can be achieved by choosing a different material for the bushing 100. The horizontal axis of FIG. 5 is shown in millimeters or inches of cumulative seat belt extension measured after a pretensioner, if used, has rewound the seat belt about the spool for a first crash. After the bushing 100 has been compressed and the first impact has subsided the retractor 20 shown above is fully functional and will rewind the protracted webbing onto the spool as soon as the occupant forces have subsided.

As can be appreciated from the above, the amount of seat belt webbing permitted to protract and the permitted amount of spool rotation under control of the energy absorbing mechanisms of the retractor 20 are limited only by the amount of designed travel of the nut 90, the characteristics of the bushing 100 and the pitch of the threads 80 and 94. This permitted motion is independent of the reverse rotation of the spool during pretensioner operation.

Figure 1:
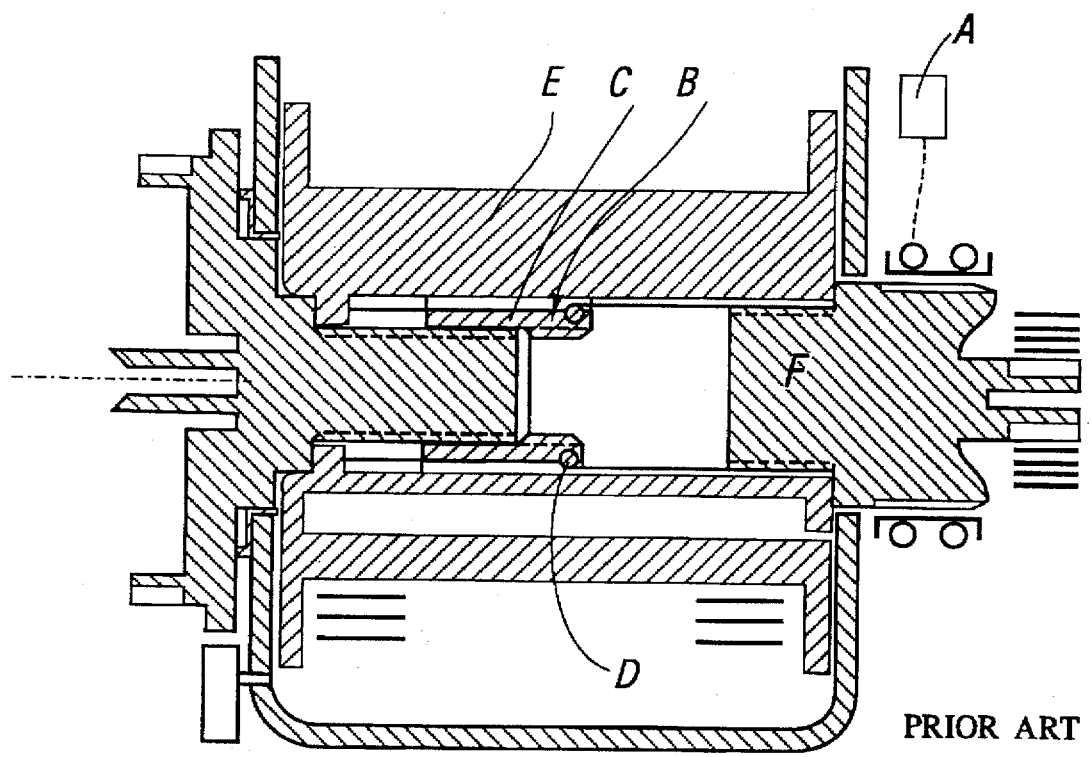
FIG. 1 shows a retractor having a pretensioner that directly drives a spool.
Figure 8:
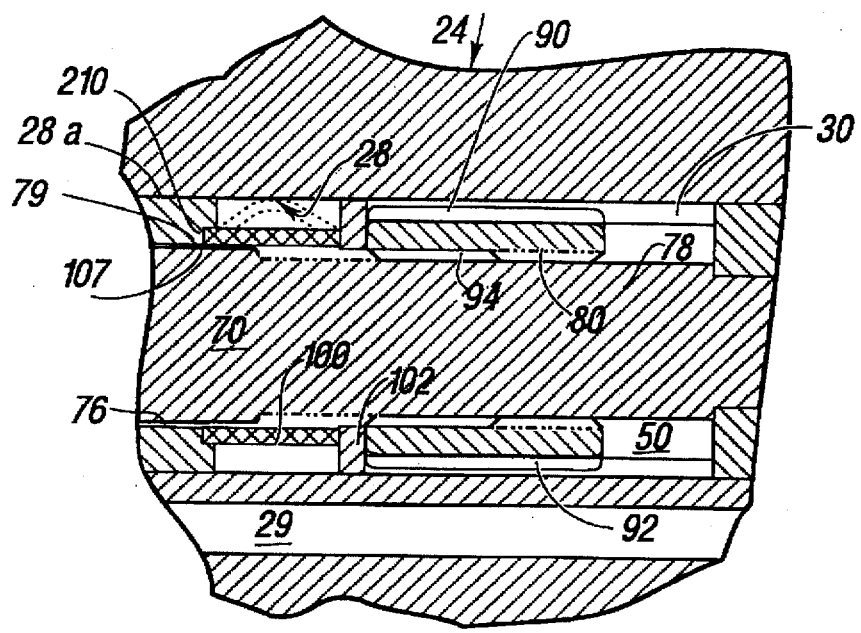
FIG. 8 shows an alternate embodiment of the invention.

Reference is briefly made to FIG. 8 which illustrates an alternate embodiment of the invention. In this embodiment the annular member 79 includes an annular cutout 210 within which an end 107 of the a bushing such as bushing 100 is entrapped. With the end 107 of the bushing 100 entrapped, as the nut 90 and washer 102 compressively load the bushing 100 the center of the bushing 100 is encouraged to deform outwardly, taking the preferred barrel shape.

We claim:

1. A safety system comprising:

energy absorbing seat belt retractor (20) and a pretensioner means for initiating rewinding a retractor spool (24) and the seat belt (31) subsequent to an accident, the pretensioner means operatively coupled to a first portion of the retractor;

the retractor (20) includes a rotationally mounted spool (24) connected to the first portion and an energy absorbing means (70, 90, 100, 102) for permitting the controlled rotation of the spool and the controlled protraction of the belt as the belt is loaded by an occupant, the retractor having a first mode of operation, prior to an accident, in which the spool is free to rotate to protract and retract the belt in correspondence with the forces into thereto, a second mode of operation in which a lock wheel, operatively coupled to the spool, is prohibited from rotating in a spool protracting direction by interaction with a locking device and in such second mode of operation the energy absorbing means is able to absorb energy permitting the controlled protraction of the belt, as the seat belt is loaded above a first level by the occupant, and a third mode of operation, entered into subsequent to the accident, in which the pretensioner means is activated to engage the first portion and rewind the spool and with the locking device activated to prevent rotation of the lock wheel the energy absorbing means permits the controlled protraction of the belt as the belt is loaded above the first level by the occupant, wherein the performance of the energy absorbing means is the same regardless of whether or not the pretensioner means is in or out of engagement with the first portion.

2. A safety system comprising:

energy absorbing seat belt retractor (20) and a pretensioner means for initiating rewinding a retractor spool (24) and the seat belt (31) subsequent to an accident;

the retractor (20) including a rotationally mounted spool (24) and an energy absorbing means (70, 90, 100, 102) for permitting the controlled rotation of the spool and the controlled protraction of the belt as the belt is loaded by an occupant, such controlled protraction of the belt being independent of the amount that the spool was caused to rewind in response to the operation of the pretensioner means;

wherein the energy absorbing means includes:

an axle assembly (50) received within a bore (28) of the spool (24) having a first axle member (52) and a second axle member (70) directly driven by the first axle member, the first axle member (52) including a first part operatively coupled to be rotated by operation of the pretensioner means (200, 62) and a second part (53) comprising part of a support means for rotationally supporting one side of the spool (24) thereon.

3. The apparatus as defined in claim 2 further including:

a lock wheel operatively coupled to the second axle member (70), including a plurality of lock teeth (73) associated therewith;

first means for engaging the lock wheel upon sensing a one of a vehicle deceleration and seat belt extraction above certain determinable levels to stop the lock wheel and the second axle member from rotation.

4. The apparatus as defined in claim 2 wherein the second axle part is operatively coupled to and drives the spool.

5. The apparatus as defined in claim 4 wherein the energy absorbing means further includes a deformable member which absorbs or dissipates energy as it is deformed.

6. The apparatus as defined in claim 5 wherein the deformation of the deformable member is in proportion to relative movement between the spool and the second axle part.

7. The apparatus as defined in claim 2 wherein a washer (102) interposes the deformable member (100) and a nut (90), wherein a first side (103) of the washer has a surface finish other than polished and an opposing side.

8. The apparatus as defined in claim 7 wherein an opposing side of the washer is one of ground or polished.

9. The apparatus as defined in claim 2 wherein a stop and bushing member (79) interposes the second axle member (70) and the spool (24), wherein the stop and bushing member provides a reaction surface upon which the deformable member is pushed by the nut and further rotationally supports the spool.

10. A safety system comprising:

energy absorbing seat belt retractor (20) and a pretensioner means for initiating rewinding a retractor spool (24) and the seat belt (31) subsequent to an accident;

the retractor (20) including a rotationally mounted spool (24) and an energy absorbing means (70, 90, 100, 102) for permitting the controlled rotation of the spool and the controlled protraction of the belt as the belt is loaded by an occupant, the energy absorbing means including:

an axle assembly (50) received within a bore (28) of the spool (24) having a first axle member (52) and a second axle member (70) driven by the first axle member, the first axle member (52) including a first part operatively coupled to be rotated by operation of the pretensioner means (200, 62) and a second part (53) comprising part of a support means for rotationally supporting one side of the spool (24) thereon;

wherein the energy absorbing means includes:

a sliding and rotating nut (90) is supported between the second axle member (70) and the spool, the nut moves in response to the relative rotation between the second axle member and the spool, a deformable member (100) is mounted about the second axle member (70) and deformed upon contact with the nut to generate a reaction force which is transferred through the nut to the spool (24) to control the rotating of the spool and the protraction of the seat belt wound thereabout.

11. The apparatus as defined in claim 10 wherein a washer (102) interposes the deformable member (100) and the nut (90) wherein a first side (103) of the washer has a surface finish other than polished and an opposing side.

12. The apparatus as defined in claim 11 wherein the surface finish of the first side (103) is characterized as having a surface of greater than 32 microns.

13. The apparatus as defined in claim 11 wherein an opposing side of the washer is one of ground or polished.

14. The apparatus as defined in claim 11 wherein an interface between the washer and the nut is characterized as a low friction interface.

15. The apparatus as defined in claim 10 wherein a stop and bushing member (79) interposes the second axle member (70) and the spool (24), wherein the stop and bushing member provides a reaction surface upon which the deformable member is pushed by the nut.

16. The apparatus as defined in claim 15 wherein a portion of the stop and bushing member comprises another part of the support means for rotationally supporting a contacting portion of the spool.

17. The apparatus as defined in claim 16 wherein the deformable member (100) is a cylindrical bushing having a first end in contact with the nut and a second end.

18. The apparatus as defined in claim 17 wherein the second end of the bushing is received within a notch formed in the stop and bushing member.

19. The apparatus as defined in claim 10 further including:

a lock wheel operatively coupled to the second axle member (70), including a plurality of lock teeth (73) associated therewith;

first means for engaging the lock wheel upon sensing a one of a vehicle deceleration and seat belt extraction above certain determinable levels to stop the lock wheel and the second axle member from rotation.

* * * * *